ns der Technischen Chemie, 4th
United States Patent [19]

Girg et al.

[11] 4,283,229
[45] Aug. 11, 1981

[54] PROCESS FOR THE PREPARATION AND USE OF STABLE CELLULOSE ETHER SUSPENSIONS

[75] Inventors: Friedrich Girg, Idstein; Volker Knittel, Wiesbaden, both of Fed. Rep. of Germany

[73] Assignee: Hoechst Aktiengesellschaft, Fed. Rep. of Germany

[21] Appl. No.: 10,809

[22] Filed: Feb. 9, 1979

[51] Int. Cl.³ .......................... C04B 13/00; C08L 1/26
[52] U.S. Cl. ................................ 106/171; 106/197 R; 106/314; 106/183; 106/188; 106/189; 106/194; 106/186
[58] Field of Search .................. 106/193, 194, 197 R, 106/314, 315, 198, 93, 171, 186, 188, 189

[56] References Cited

U.S. PATENT DOCUMENTS

| | | | |
|---|---|---|---|
| 2,947,645 | 8/1960 | Milne | 106/170 |
| 3,149,073 | 9/1964 | Nemes et al. | 106/194 |
| 3,483,007 | 12/1969 | Hook | 106/93 |
| 4,069,062 | 1/1978 | Bürge | 106/93 |

FOREIGN PATENT DOCUMENTS

| | | |
|---|---|---|
| 4528 | 4/1966 | Australia . |
| 527197 | 6/1931 | Fed. Rep. of Germany . |
| 2417086 | 11/1974 | Fed. Rep. of Germany . |

OTHER PUBLICATIONS

Ullmanns Encykopädie der Technischen Chemie, 4th Ed., vol. 9, p. 196, 1975.
Viscosity Stabilizer for High Adhesion Metallizing Pastes, IBM Tech. Bul., vol. 19, No. 9, Feb. 1977, p. 3386.

*Primary Examiner*—Theodore Morris
*Attorney, Agent, or Firm*—James E. Bryan

[57] ABSTRACT

This invention relates to an improvement in the process for the preparation of a stable aqueous electrolyte-containing cellulose ether suspension, wherein an inherently water-soluble cellulose ether is added, in the form of solid particles, to an aqueous solution of an electrolyte and uniformly distributed therein, the improvement comprising using a non-ionogenic cellulose ether and adding alumina to the suspension.

5 Claims, No Drawings

PROCESS FOR THE PREPARATION AND USE OF STABLE CELLULOSE ETHER SUSPENSIONS

The present invention relates to a process for the preparation of a stable aqueous cellulose ether suspension which contains an electrolyte, and to the use of such a suspension.

To avoid the formation of dust when introducing powdery or granular cellulose ethers into a prepared mixture of building materials or painting compositions, e.g., but also for very accurate dosing of the cellulose ether added to an already prepared mixture, or for quick distribution of the cellulose ether in the mixture, two procedures are primarily known: (1) the cellulose ether is used in the form of an aqueous solution, or (2) the cellulose ether is dissolved or suspended in an organic solvent or in a mixture of organic solvents, to which a certain amount of water may be added, if desired.

These known methods have some disadvantages, however. Cellulose ether solutions in water or in organic solvents may be prepared up to relatively low concentrations (about 2 to 4 percent by weight solutions) only, thus creating problems, e.g. regarding the transportation and storage of relatively large quantities of liquid. Furthermore, cellulose ether solutions have a viscous, adhesive consistency, especially within the upper concentration range, and this property causes the solution to adhere to the walls of containers, to tubes and to pumps and necessitates a troublesome cleaning of such equipment. Frequently, the customer wishes to utilize the positive properties of these solutions or dispersions, but wishes to introduce as little liquid as possible into the mixture, for example. If organic liquids are used as solvents or suspending agents, additional drawbacks are caused by the rapid evaporation of some of these liquids and by the variations in concentration which may be caused thereby, further by their physiological effect upon human beings and by their specific density which may be unsuitable in some cases. Due to the last-mentioned property, the cellulose ethers may have a higher specific density and thus tend to settle out in the suspension and can be stirred up again only with difficulty. Moreover, when the cellulose ethers are to be used in mortar or concrete mixtures, organic solvents are unsuitable, because they frequently affect the setting capacity of these mixtures in an undesirable manner.

Regarding the behavior of cellulose ether solutions when foreign substances are added to influence their solubility, the following observations have become known, e.g., from the prior art:

German Pat. No. 527,197, discloses a process for the preparation of non-swellable or sparingly soluble alkyl cellulose derivatives, wherein aqueous alkyl cellulose solutions are mixed with water-insoluble substances which are capable of forming colloids with the aqueous solution without reacting with the alkyl celluloses. Latex, phenol-formaldehyde resins, linseed oil, benzyl alcohol, tanning agents, and ethyl cellulose are exemplary of water-insoluble substances which may be used. According to the disclosure of the German Patent, alkyl celluloses thus rendered non-swellable or only slightly soluble are suitable for the manufacture of such structures as films, filaments, and plastic masses.

The stable cellulose ether composition according to U.S. Pat. No. 2,947,645, has a pH range from about 5 to about 9 and contains water-insoluble, alkali-soluble cellulose ethers. According to the aforementioned U.S. patent, the composition may be used for the preparation of certain structures or coatings, the solvent being removed. The composition is prepared as follows: The water-insoluble and alkali-soluble cellulose ether is completely dissolved in an about 0.5 to 4 percent by weight aqueous alkali solution and the resulting solution is mixed with sufficient acid that a pH value of about 5 to 9 is produced. Alkane carboxylic acids, maleic acid, 2,4-dimethyl-benzoic acid, fluosilicic acid, sulfuric acid, and boric acid are exemplary of suitable acids. The process allegedly leads to stable cellulose ether solutions or dispersions.

Further, it is known from Ullmann's "Encyklopädie der technischen Chemie", 4th Edition, Vol. 9, Page 196 (1975) (under the heading "Celluloseäther"), that salts substantially influence the gel point of aqueous cellulose ether solutions. Low concentrations of neutral salts are compatible with aqueous solutions of cellulose ethers, but if higher concentrations of neutral salts are present, the viscosity may be reduced or the cellulose ether may flocculate. In the case of methyl celluloses, it is known that flocculation is reversible and that the sediment may be redissolved by diluting the system with water. As regards the influence of the cation or anion of the salt used upon the solubility characteristics of methyl celluloses, two series of ions may be arranged in the manner of a lyotropic series according to Hofmeister, and among the extreme values, the $Pb^{++}$ ion and the $CO_3^{--}$ ion are regarded as strongly influencing and the $Na^+$ ion and the $CO_3^{--}$ ion as weakly influencing. Hydroxyethyl cellulose is considered to be more compatible with salt solutions of moderate concentration than methyl celluloses. In the case of the non-ionogenic cellulose ethers just mentioned, the flocculation process does not represent a chemical reaction, such as may occur when salts act upon ionogenic carboxy methyl cellulose, but the process is a reversible dehydration, or, in other words, an electrolyte coagulation. The fact that the solubility behavior can be influenced by certain salts is used in practice to prevent, as far as possible, a flocculation of the cellulose ether, e.g. by using certain types of cellulose ethers which are relatively insensitive, or by adjusting certain conditions when using cellulose ethers in aqueous systems.

German Offenlegungsschrift No. 2,417,086, discloses an additive to mortar and concrete which comprises water-soluble, swellable polymeric substances and is finely suspended either in an aqueous salt solution or in an organic solvent. The salts dissolved in the aqueous phase or the organic solvent have the purpose of preventing the polymeric substances from dissolving or swelling. Cellulose derivatives, such as methyl cellulose, hydroxy ethyl cellulose, hydroxy propyl cellulose, and carboxy methyl cellulose, i.e. cellulose ethers, are exemplary of water-soluble, swellable, polymeric substances. In practice, however it was found that it is not possible in all cases to produce stable cellulose ether suspensions without producing relatively high electrolyte concentrations. An unduly high electrolyte content of the electrolyte solution, in particular a content of more than about 10 to 12 percent by weight, is frequently disadvantageous for certain applications, so that heretofore it was impossible to use stable cellulose ether suspensions for these purposes.

It is the object of the present invention to provide a process for the preparation and use of aqueous electrolyte-containing cellulose ether suspensions which are stable also with a low concentration of electrolyte.

The present invention is derived from a known process for the preparation of a stable, aqueous, electrolyte-containing cellulose ether suspension, wherein an inherently water-soluble cellulose ether is added in the form of small solid particles to an aqueous solution of an electrolyte and uniformly distributed therein. In the process according to the invention, a non-ionogenic cellulose ether is used and alumina is added to the suspension.

In a preferred embodiment of the process according to the invention, an organic substance which stabilizes the suspension and reduces its viscosity is added in addition to the alumina additive.

In the present context, the term "water-soluble, non-ionogenic cellulose ethers" is meant to include, above all: methyl cellulose (MC), alkyl-hydroxyalkyl cellulose, and hydroxy alkyl cellulose, preferably methyl-hydroxyethyl cellulose (MHEC), methyl-hydroxypropyl cellulose (MHPC), ethyl-hydroxyethyl cellulose (EHEC), and hydroxy-ethyl cellulose (HEC); other mixed ethers also may be used, provided they are water-soluble and their character is at least preponderantly non-ionogenic. The cellulose ethers used according to the invention should be inherently water-soluble, i.e. they should dissolve in distilled water or tap water; during the performance of the process according to the invention, they are preponderantly, i.e. to more than 75 percent by weight insoluble, or even completely insoluble in an aqueous electrolyte solution containing the additives according to the invention. Prior to their use in the process according to the invention, the cellulose ethers may be in the form of a powder, a fibrous material, or a granular material. They can be suspended in accordance with the invention not only when they are in a form in which they temporarily swell only a little in water or not at all, but also when they are not treated to influence their swelling behavior, e.g. subjected to superficial chemical cross-linking or some other modification process.

The aqueous electrolyte solution is produced by dissolving bases or acids, preferably, however, one or more salts, in water. Suitable salts are the metal or ammonium salts of mineral acids or organic acids, especially salts which contain an alkali metal ion, an alkaline earth metal ion, an earth metal ion, or a zinc, copper, iron or manganese ion as the cation, and a sulfate, carbonate, silicate, sulfite, halogenide, phosphate, nitrate, nitrite, acetate, formiate, tartrate, or citrate ion, including their hydrogen salts (e.g. the hydrogen carbonate ion) as the anion. Advantageously, the concentration of electrolyte in the aqueous electrolyte solution is so adjusted, that not more than 10 to 12 percent by weight of dissolved electrolyte is contained in the solution. As regards the upper limit for the electrolyte to be dissolved according to the present invention, the proportion by weight of electrolyte in the solution is also determined by the solubility product of the electrolyte in question, so that it is quite possible that for some electrolytes an electrolyte concentration of 10 percent by weight cannot be achieved. Preferably, alkali carbonates and alkali, alkaline earth, and earth metal sulfates are used for the preparation of the electrolyte solution, alkali carbonates being particularly preferred.

Advantageously, the aqueous electrolyte solution is prepared in a manner such that its concentration of electrolyte is sufficiently high, i.e. about 4 percent by weight or more, to prevent the cellulose ether from being dissolved. Although the cellulose ethers can be suspended in such electrolyte solutions, stable suspensions, i.e. those which remain stable for relatively long periods of time, i.e., at least for more than 3 to 5 hours, or even several days, are not formed, which means that sooner or later the cellulose ethers settle out again.

If these suspensions of cellulose ethers in electrolyte solutions—which at best are only temporarily stable—are mixed with finely divided alumina, especially in quantities ranging from about 0.1 to 10 percent by weight, preferably between about 0.5 and 5 percent by weight, calculated on the weight of the electrolyte solution, the stability of the cellulose ether suspension is considerably improved, i.e. the resulting suspensions are still stable after about at least 3 to 5 hours, normally after several days, and in some cases even after half a year. The term "finely divided alumina" as used herein means either finely divided aluminum oxide ($Al_2O_3$), especially pyrogenic $Al_2O_3$, in one of the known modifications, or finely divided aluminum hydroxide. Of course, the term also includes all known transition forms between aluminum oxides and aluminum hydroxides, e.g. $AlO(OH) = Al_2O_3 \cdot H_2O$. The alumina may be added to the electrolyte solution before it is mixed with the cellulose ether.

The stability of the suspension may be further improved and its viscosity reduced by additional means. Among the organic substances which are suitable for this purpose and which may be added either alone or in admixture with each other, the following are preferred: glycols, such as monoethylene glycol, diethylene glycol, propylene glycol or polyethylene glycol; further, long-chain monohydric alcohols, such as oleyl alcohol; hydroxyethylated alcohols, hydroxyethylated amines, hydroxyethylated fatty acids, propylene oxide/ethylene oxide adducts, and long chain fatty acids, such as oleic acid, tall oil fatty acid, or fish oil fatty acid. These substances are advantageously added in quantities ranging from about 0.05 to 20 percent by weight, preferably from 0.1 to 6 percent by weight, calculated on the weight of the electrolyte solution.

The viscosity reducing effect and good stabilization of the suspension are particularly evident when alkali carbonates are used as the electrolyte, and in this case quantities of the organic substance ranging from about 0.05 to 3 percent by weight are sufficient in normal cases.

The cellulose ether suspensions prepared according to the invention may contain from about 0.05 to 40 percent by weight, preferably between about 5 and 30 percent by weight, of cellulose ether, calculated on the quantity of the electrolyte solution; they have a viscosity, according to Höppler, of less than 3000 cP at a temperature of 20° C., those stable suspensions being preferred whose viscosity, according to Höppler, is less than 300 cP at 20° C. The cellulose ether suspensions according to the present invention are not tacky, or only very slightly so, and may contain conventional additives, such as anti-foaming agents, fungicides, and bactericides, without their suspension characteristics being seriously affected by such additions. Furthermore, wetting agents may be added, provided the effect is considered which such agents may have upon the suspension.

The stable aqueous electrolyte-containing cellulose ether suspensions prepared in accordance with the present invention are capable of being pumped, contain relatively large quantities of cellulose ether, can be easily dosed, and thus can be used for all fields of application where a definite quantity of a cellulose ether is to be introduced into already prepared mixtures, especially aqueous mixtures. Moreover, due to the relatively small quantity of aluminum oxide added, which interferes very little or not at all with the preferred purposes of the solutions, the quantity of electrolyte may be reduced to a reasonable volume. Among the possible fields of application of the suspensions, the following are preferred:

The cellulose ether suspensions prepared according to the present invention may be introduced into mixtures containing aqueous building materials and impart to these the effect of the cellulose ethers as thickening agents, water-retaining agents, and adhesives. The field of applications in building materials includes, inter alia, concrete, mortar used for plasterwork or cementing, knifing fillers, and masses used for the pretreatment of brickwork before plastering. The aqueous building materials in question are normally mixtures containing an inorganic binder, fillers and aggregates, water, and, if desired, one or more adjuvants. Cement, lime, gypsum, calcined magnesite, or mixtures of two or more of these substances are normally used as binders. Granular inorganic substances are used, as a rule, as fillers or aggregates, e.g. fine to coarse sand, silicates based on mineral dust or blast furnace slag, limestone powder, kaolin, kieselguhr, perlite, pumice, and pellets of foamed plastics. The adjuvants include, in addition to the cellulose ethers used, pore formers, setting retardants and accelerators, anti-foaming agents, anti-freeze mixtures or substances which increase the water-impermeability of the material; these adjuvants are of advantage for certain applications of the aqueous building materials (e.g. lightweight concrete or thin mortar layers). For some applications, the use of filters or aggregates can be dispensed with, in particular if the building materials consist of gypsum or anhydrite. Building materials containing no inorganic binder, i.e. products which do not set, but are dried, also may be used.

Furthermore, the cellulose ether suspensions prepared in accordance with the present invention are very suitable for incorporation into mixtures to be used as plastic dispersion paint, plastic-based plaster, or distemper paint. The cellulose ethers are added to these paints or plasters in order to improve their water retention capacity, processing characteristics, and adhesion. The plastic dispersion paints, plastic-based plasters, and distemper paints are aqueous systems and are normally sold in the form of a white or slightly off-white mass. Their compositions may be taken from DIN 18363 entitled: "Anstricharbeiten" (Painting Jobs) published in September 1976: plastic dispersion paints contain plastic dispersions, pigments (normally white pigments, e.g. titanium dioxide, lithophones or chalk), fillers (e.g. calcium carbonates, powdered quartz, barium sulfate, fibrous materials, and granulates), and auxiliaries, e.g. fungicides; they may be either fluid or pasty and are subdivided, according to their composition, into the following groups: washing-resistant, abrasion-resistant, and weather-resistant.

Plastic-based plasters are distinguished from plastic dispersion paints in that they contain fillers which impart a certain structure thereto. Distemper paints contain sizes, pigments (normally white pigments), and fillers, e.g. fibrous materials. Plastic dispersions include many of the dispersions of film-forming homo- or copolymers of acrylic acid esters, methacrylic acid esters, acrylic and methacrylic acid, styrene, ethylene, butadiene, acrylonitrile, vinyl acetate, vinyl propionate, vinyl esters of long-chain branched carboxylic acids, or maleic acid esters. Suitable sizes are binders in general, such as water-soluble cellulose ethers, starch, dextrin, vegetable glues, bone glue, and other animal glues.

Because a wide variety of organic substances and of electrolytes, especially salts, can be employed in the process according to the invention, the customer can adjust the suspension to the special requirements of each particular case, as regards adverse effects, compatibility, or possible sedimentation, by making simple small-scale tests, or by studying the instructions which are attached for his information.

The invention will be further illustrated by reference to the following specific examples:

EXAMPLES 1 TO 26

The components of the stable aqueous electrolyte-containing cellulose ether suspensions according to the invention may be taken from the following Table (Exs. 1 to 26). The suspensions prepared in accordance with the invention were stable at least after 3 to 5 hours, normally after several days, and in some cases even after 6 months. The mixtures are prepared as follows:

The electrolyte in question is dissolved in water and 1000 g of the electrolyte solution are mixed with the finely divided alumina, which may be either in the form of pyrogenic $Al_2O_3$ (>97% of $Al_2O_3$, <0.1% of $TiO_2$, <0.1% of $SiO_2$, <0.2% of $FE_2O_3$, <0.5% of HCl) or an alumina gel of Type I (about 45% of $Al_2O_3$, about 11% of $SO_3$, <0.2% of $SiO_2$, about 0.05% of $Fe_2O_3$, about 10% of $H_2O$) or alumina gel of Type II (about 45% of $Al_2O_3$, about 12% of $SO_3$, about 0.2% of $SiO_2$, about 0.04% of $Fe_2O_3$, and about 18% of $H_2O$) and uniformly distributed therein by stirring. Then a cellulose ether is added in the form of a powder and is also uniformly distributed in the mixture. Finally, the organic substance, which may be added in order to stabilize the suspension and reduce its viscosity, but was omitted in some examples, is added and is also uniformly distributed in the suspension by thorough agitation. The sequence in which alumina, cellulose ether, and, if desired, organic substance are added may be varied, without substantially changing the stability of the suspension.

The resulting stable suspensions may be designated as low viscosity mixtures (i.e. with a viscosity according to Höppler of less than about 300 cP=0.3 Pa·s at 20° C.) or medium viscosity mixtures (i.e. with a viscosity according to Höppler of less than about 3000 cP=3 Pa·s at 20° C.). Examples 1, 5 to 19, and 21 to 26 produce low viscosity mixtures, and Examples 2 to 4 and 20 produce medium viscosity mixtures.

The viscosities listed in column 6 of the Table are the values in cP or Pa·s measured according to Höppler in a 2 percent by weight aqueous solution at 20° C.

Comparison Tests V 1 to V 6 (see Table)

Mixtures (stable dispersions) with a high electrolyte content (V 1 to V 4) and mixtures (unstable dispersions) with a low electrolyte content, but comparable to that of the electrolyte solutions according to the invention (V 5 and V 6), were prepared for comparison purposes. A high electrolyte concentration results in a stable dispersion, but the electrolyte content may be undesirable for certain applications; lower electrolyte concentrations do not produce stable dispersions without the additive according to the invention. All mixtures are of medium viscosity.

TABLE

| No. of Ex. | Type of Electrolyte | Electrolyte Concentration (% b.w.) | Type and Proportion (% b.w.) of alumina in suspension | Type and Proportion (% b.w.) of organic substance in suspension | Type of Cellulose Ether, its degree of substitution and viscosity | Proportion of cellulose ether (% b.w.) in suspension |
|---|---|---|---|---|---|---|
| 1 | K$_2$CO$_3$ | 10 | Al$_2$O$_3$, 1 | oleic acid 0.1 | MHEC DS: 1.4–2.0 MS: 0.1–0.3 30,000 cP $\triangleq$30 Pa·s | 20 |
| 2 | " | 10 | Al$_2$O$_3$, 1 | — | MHEC DS: 1.4–2.0 MS: 0.1–0.3 30,000 cP 30 Pa·s | " |
| 3 | " | 10 | Gel I, 2 | — | MHEC DS: 1.4–2.0 MS: 0.1–0.3 30,000 cP 30 Pa·s | " |
| 4 | " | 10 | Gel II, 2 | — | MHEC DS: 1.4–2.0 MS: 0.1–0.3 30,000 cP 30 Pa·s | " |
| 5 | " | 10 | Gel I, 2 | oleic acid, 0.1 | MHEC DS: 1.4–2.0 MS: 0.1–0.3 30,000 cP 30 Pa·s | " |
| 6 | " | 10 | Gel II, 2 | oleic acid, 0.1 | MHEC DS: 1.4–2.0 MS: 0.1–0.3 30,000 cP 30 Pa·s | " |
| 7 | " | 10 | Al$_2$O$_3$, 1 | oleyl alcohol 0.8 | MHEC DS: 1.4–2.0 MS: 0.1–0.3 30,000 cP 30 Pa·s | " |
| 8 | " | 10 | Gel I, 2 | propylene oxide/ ethyleneoxide adduct (20 mole % AeO), 0.25 | MHEC DS: 1.4–2.0 MS: 0.1–0.3 30,000 cP 30 Pa·s | " |
| 9 | " | 10 | Gel II, 2 | tributylphenol + 8 mole % AeO, 0.15 | MHEC (as in Ex.1) | " |
| 10 | " | 9 | Gel I, 3 | monoethyleneglycol 4.0 | MHEC (as in Ex.1) | " |
| 11 | " | 10 | Gel II, 3 | propyleneoxide/ ethyleneoxide adduct (40 mole % AeO), 1.0 | EHEC DS: $\geq$ 0.9 MS: $\geq$ 0.8 30,000 cP $\triangleq$30 Pa·s | 25 |
| 12 | " | 10 | Al$_2$O$_3$, 2 | oleic acid + 15 mole % AeO, 0.25 | MHEC (as above) | 20 |
| 13 | " | 10 | Gel I, 2.5 | oleylamine + 10 mole % AeO, 0.2 | MHEC (as above) | " |
| 14 | " | 9 | Gel II, 2.5 | isotridecyl alcohol + 8 mole % AeO, 0.1 | MHEC (as above) | " |
| 15 | " | 10 | Al$_2$O$_3$, 1.5 | diethyleneglycol 5.0 | MHEC (as above) | " |
| 16 | " | 9 | Gel I, 3 | polyethylene glycol 5.0 | MHEC (as in Ex.1) | " |
| 17 | " | 9 | Gel II, 4 | oleyl alcohol 1.0 | MHEC DS: 1.4–2.0 MS: 0.1–0.3 3,000 cP $\triangleq$3 Pa·s | " |
| 18 | " | 10 | Al$_2$O$_3$, 1.25 | fish oil fatty acid, 0.25 | MHEC DS: 1.3–1.6 MS: 0.1–0.3 6,000 cP $\triangleq$6 Pa·s | " |
| 19 | MgSO$_4$ sicc. | 9 | Gel I, 3.0 | oleyl alcohol 1.0 | MHEC DS: 1.4–2.0 | " |

TABLE-continued

| No. of Ex. | Type of Electrolyte | Electrolyte Concentration (% b.w.) | Type and Proportion (% b.w.) of alumina in suspension | Type and Proportion (% b.w.) of organic substance in suspension | Type of Cellulose Ether, its degree of substitution and viscosity | Proportion of cellulose ether (% b.w.) in suspension |
|---|---|---|---|---|---|---|
| 20 | MgSO₄ sicc. | 9 | Gel I, 3.0 | — | MHEC DS: 1.4–2.0 MS: 0.1–0.3 10,000 cP ≙10 Pa · s | " |
| 21 | MgSO₄ sicc. | 9 | Gel II, 3.0 | isotridecyl alcohol + 8 mole % AeO, 0.25 | MHEC DS: 1.4–2.0 MS: 0.1–0.3 10,000 cP 10 Pa · s (as in Ex.20) | " |
| 22 | MgSO₄ sicc. | 9 | Al₂O₃, 1.5 | monoethylene glycol 5.0 | MHEC (as above) 30,000 cP | " |
| 23 | MgSO₄ sicc. | 9 | Gel I, 3.0 | butylglycol 5.0 | MHEC (as above) 30,000 cP | " |
| 24 | MgSO₄ sicc. | 9 | Gel II, 2.0 | oleyl alcohol 1.0 | MHPC DS: 1.3–1.6 MS: 0.2–0.4 200 cP ≙0.2 Pa · s | " |
| 25 | MgSO₄ sicc. | 9 | Al₂O₃, 1.5 | monoethylene glycol, 2.0 | MHPC (as above) 3,000 cP ≙3 Pa · s | " |
| 26 | MgSO₄ sicc. | 9 | Gel I, 2.5 | oleic acid + 5% castor oil + 32 mole % ethylene oxide 1.0 | MHEC DS: 1.3–1.6 MS: 0.1–0.3 6,000 cP ≙6 Pa · s | " |
| V 1 | K₂CO₃ | 28 | — | — | MHEC DS: 1.3–2.0 MS: 0.1–0.3 30,000 cP ≙30 Pa · s | 25 |
| V 2 | " | 20 | — | — | MHEC DS: 1.3–2.0 MS: 0.1–0.3 30,000 cP 30 Pa · s | " |
| V 3 | MgSO₄ sicc. | 16 | — | — | MHEC DS: 1.3–2.0 MS: 0.1–0.3 30,000 cP 30 Pa · s | 20 |
| V 4 | MgSO₄ sicc. | 24 | — | — | MHEC DS: 1.3–2.0 MS: 0.1–0.3 30,000 cP 30 Pa · s | " |
| V 5 | K₂CO₃ | 10 | — | — | MHEC DS: 1.3–2.0 MS: 0.1–0.3 30,000 cP 30 Pa · s | " |
| V 6 | MgSO₄ sicc. | 9 | — | — | MHEC DS: 1.3–2.0 MS: 0.1–0.3 30,000 cP 30 Pa · s | " |

Note: The proportion of alumina (column 4), organic substance (column 5), and of cellulose ether (column 7) is based on the quantity of the electrolyte present. The abbreviation "AeO" stands for ethylene oxide.

It will be obvious to those skilled in the art that many modifications may be made within the scope of the present invention without departing from the spirit thereof, and the invention includes all such modifications.

What is claimed is:

1. In the process for the preparation of a stable aqueous electrolyte-containing cellulose ether suspension, wherein an inherently water-soluble cellulose ether is added, in the form of solid particles, to an aqueous solution of an electrolyte and uniformly distributed therein, the improvement comprising using a non-ionogenic cellulose ether and adding alumina to the suspension, and wherein the amounts of the components of said suspension are about 0.5 to 40 percent by weight of said non-ionogenic cellulose ether, about 4 to 12 percent by weight of electrolyte and about 0.1 to 10 percent by weight of alumina, calculated on the weight of the electrolyte solution.

2. A process according to claim 1 including adding, in an amount of about 0.05 to 20 percent by weight calculated on the weight of the electrolyte solution, and in addition to alumina, an organic substance selected from the group consisting of glycols, long-chain monohydric alcohols, hydroxyethylated alcohols, hydroxyethylated amines, hydroxyethylated fatty acids, propylene oxide/ethylene oxide adducts, and long-chain fatty acids, which stabilizes the suspension and reduces the viscosity thereof.

3. A process according to claim 1 in which a methyl cellulose, an alkyl hydroxyalkyl cellulose, or a hydroxyalkyl cellulose is used as the cellulose ether.

4. A process according to claim 1 in which alkali carbonates, alkali sulfates, alkaline earth sulfates, or earth metal sulfates are used as the electrolyte.

5. A process according to claim 1 in which the electrolyte used is an alkali carbonate.

* * * * *

UNITED STATES PATENT AND TRADEMARK OFFICE
CERTIFICATE OF CORRECTION

PATENT NO. : 4,283,229
DATED : August 11, 1981
INVENTOR(S) : Friedrich Girg; Volker Knittel It is certified that error appears in the above—identified patent and that said Letters Patent is hereby corrected as shown below:

Item [30] has been omitted from the cover page and should read as follows:
- - - Foreign Application Priority Data
Feb. 13, 1978 (DE)   Fed. Rep. of Germany ....2805907 - - -;

Column 4, line 50, "0.05" should read - - - 0.5 - - -;

Column 5, line 37, "filters" should read - - - fillers - - -;

Column 6, line 31, "FE$_2$O$_3$" should read - - - Fe$_2$O$_3$ - - -;

In the Table bridging columns 7 and 8, under the fifth heading, the symbol - - - $\hat{=}$ - - - has been omitted prior to "30 Pa · s" for each of Examples 2 - 8.

In the Table spanning columns 9 and 10, under the fifth heading, the symbol - - - $\hat{=}$ - - - has been omitted prior to "10 Pa · s" for Example 20; the symbol - - - $\hat{=}$ - - - has been omitted prior to "30 Pa · s" for Examples V2 through V6.

Signed and Sealed this

Twenty-sixth Day of January 1982

[SEAL]

Attest:

GERALD J. MOSSINGHOFF

Attesting Officer    Commissioner of Patents and Trademarks